United States Patent
Wistuba

(10) Patent No.: US 10,866,133 B2
(45) Date of Patent: Dec. 15, 2020

(54) CAPACITIVE LIMIT LEVEL SWITCH

(71) Applicant: IFM ELECTRONIC GMBH, Essen (DE)

(72) Inventor: Gernot Wistuba, Eriskirch (DE)

(73) Assignee: IFM ELECTRONIC GMBH, Essen (DE)

( * ) Notice: Subject to any disclaimer, the term of this patent is extended or adjusted under 35 U.S.C. 154(b) by 203 days.

(21) Appl. No.: 16/309,250

(22) PCT Filed: May 30, 2017

(86) PCT No.: PCT/EP2017/062969
§ 371 (c)(1),
(2) Date: Dec. 12, 2018

(87) PCT Pub. No.: WO2017/220293
PCT Pub. Date: Dec. 28, 2017

(65) Prior Publication Data
US 2019/0178699 A1 Jun. 13, 2019

(30) Foreign Application Priority Data
Jun. 20, 2016 (DE) .......... 10 2016 210 983

(51) Int. Cl.
*G01F 23/26* (2006.01)
(52) U.S. Cl.
CPC .......... *G01F 23/266* (2013.01); *G01F 23/265* (2013.01)
(58) Field of Classification Search
CPC ................ G01F 23/266; G01F 23/26–268
See application file for complete search history.

(56) References Cited

U.S. PATENT DOCUMENTS

| 8,044,669 B2* | 10/2011 | Palata ............... G01F 23/263 |
| | | 324/634 |
| 9,523,598 B2* | 12/2016 | Hoch ............... G01F 23/0084 |
| 2012/0268139 A1 | 10/2012 | Fend et al. |
| 2014/0352402 A1 | 12/2014 | Hoch |

FOREIGN PATENT DOCUMENTS

| CN | 1486418 A | 3/2004 |
| CN | 104081170 A | 10/2014 |
| CN | 103278211 B | 12/2015 |
| DE | 10250523 A1 | 7/2003 |
| DE | 102008027921 A1 | 12/2009 |
| DE | 102009060742 A1 | 7/2011 |
| DE | 102008027921 B4 | 11/2011 |
| EP | 1352220 B1 | 3/2015 |

* cited by examiner

*Primary Examiner* — Justin N Olamit
(74) *Attorney, Agent, or Firm* — Harness, Dickey & Pierce, P.L.C.

(57) ABSTRACT

A capacitive limit level switch comprises a measuring electrode which protrudes into and forms an electric circuit with a container and ground. Impedance at the measuring electrode depends on the presence of a medium. The switch includes a control unit including a burst generator and a diode bridge. A switching point is determined by spectral analysis of the amplitude response at the measuring electrode. The diode bridge is connected to a controllable delay circuit. A computing unit compares the spectrum of a burst signal influenced by the medium with the spectrum of a known burst signal not influenced by the medium.

5 Claims, 2 Drawing Sheets

CAPACITIVE LIMIT LEVEL SWITCH

CROSS-REFERENCE TO RELATED APPLICATIONS

This application is a National Stage of International Application No. PCT/EP2017/062969, filed on May 30, 2017, and published in German as WO2017/220293 A1 on Dec. 28, 2017. This application claims the priority to German Patent Application No. 10 2016 210 983.9, filed on Jun. 20, 2016. The entire disclosures of the above applications are incorporated herein by reference.

FIELD

The disclosure relates to a capacitive limit level switch for monitoring the level of containers filled with liquid or pourable media according to the preamble of claim 1.

BACKGROUND

This section provides background information related to the present disclosure which is not necessarily prior art.

Capacitive level sensors have long been used to determine the level, the type of medium or as a limit level switch. The main advantages of this measuring method are that it does not require any moving parts, and under certain circumstances the measurement can even be carried out through a housing wall made of an electrically insulating material.

The applicant produces and distributes electronic level sensors under the name LMT100 for water-based media and under the name LMT110 for oils and fats.

EP 1352220 B1 shows a measuring device operating according to the transit time method, in which a high-frequency (burst) signal is coupled into an electrical line, and the transit time is determined on the basis of a time-expanded received signal, wherein the time expansion is obtained by a controlled delay circuit and a complementarily controlled diode bridge. For a limit level switch this arrangement appears to be too complicated in particular also because of the directional coupler required for extracting the received signal.

DE 10 2008 027921 B4 shows an admittance measuring device for a level sensor comprising a resonant measuring electrode and a complementarily controlled diode bridge as a synchronous rectifier. The level and also the type of medium is determined here on the basis of the resonant frequency, which in turn is determined by measuring the amplitude response by "wobbling", i.e. by passing through a specific frequency range. Passing through the relevant frequency range, however, requires a certain amount of time in which electromagnetic radiation is inevitably emitted.

DE 10 2009 060742 A1 discloses a capacitive limit level switch in which according to a first embodiment the measuring electrode is applied sequentially with burst signals of different frequencies, so that with each step, one point of the frequency spectrum can be detected and evaluated.

In a further embodiment, the emission of steep-edged pulse signals containing all frequencies is proposed, whose step response is sampled and evaluated by means of a Fast Fourier Transformation.

On the one hand the relative long measuring time due to the settling time of the burst signals and on the other hand the frequency components which are included in the pulse signals and are not required for the measurement and increase the noise emission and also result in an additional warming of the device are regarded as disadvantageous.

SUMMARY

This section provides a general summary of the disclosure, and is not a comprehensive disclosure of its full scope or all of its features.

It is the object of the disclosure to shorten the actual measuring time without loss of accuracy. In addition, the use of materials should be reduced and the production costs should be reduced.

Furthermore, it is intended to avoid the emission of frequency components which are not required for the measurement, to better utilize the transmission energy, to reduce the noise emission and to avoid an unnecessary warming of the device.

This object is achieved with the features of claim 1. The dependent claims relate to the advantageous embodiment of the disclosure.

The essential idea of the disclosure is to measure in the time domain, but to shift the evaluation into the frequency domain, which is done with the aid of a burst signal, which includes the essential components of the frequency range in question between the empty resonance of the system to be measured up to the resonant frequencies which are formed with the sometimes quite different liquid or pourable media. Because of the high-frequency signals the detection of the measuring signal is advantageously carried out by undersampling.

For this purpose, instead of the known steep-edged excitation pulse a burst signal is to be used which includes all required frequency components but avoids unnecessary frequency components. Thus, the spectral energy density is increased mainly in the frequency range of interest which leads to the above-mentioned advantages.

In a further advantageous embodiment, a burst consisting of two pulses is selected without restricting the disclosure thereto.

The advantage of the disclosure is inter alia that only the burst or the burst response of the system has to be sampled in the time domain, and the further processing can be carried out in a microcontroller or signal processor. By means of today's digital technology a burst can be produced much easier than a stable variable-frequency high-frequency sinusoidal signal, which significantly reduces the number of components and thus the costs.

By means of the time expansion factor the ratio between the measuring time and the sampling rate can be set within wide limits without loss of accuracy and optimized in this way.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure will be explained in more detail with reference to the drawing.

Corresponding reference numerals indicate corresponding parts throughout the several views of the drawings.

DETAILED DESCRIPTION

Example embodiments will now be described more fully with reference to the accompanying drawings.

Figure 1:
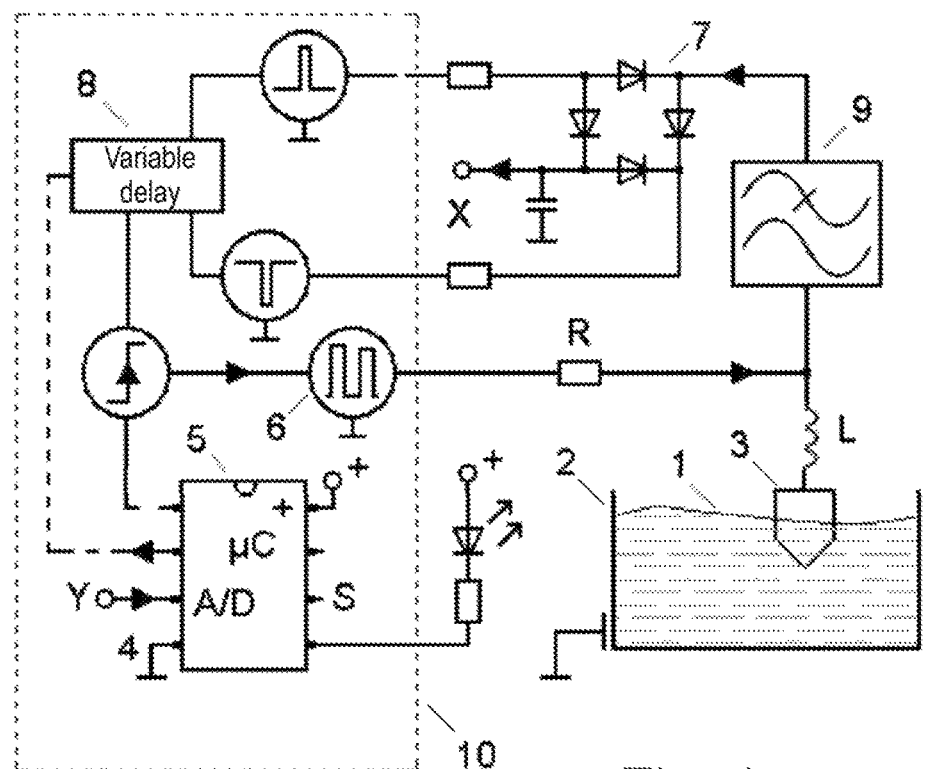
FIG. 1 shows a measuring arrangement according to the disclosure in a simplified block diagram.

FIG. 1 shows a medium 1 within a container 2 with a measuring electrode 3 which protrudes into the container and is capacitively coupled to the device ground 4 via the environment of the container 2 shown as a ground terminal, so that a closed alternating current circuit is formed.

A control unit 5 shown here as a microcontroller generates a switching edge which is supplied to a burst generator 6 and to a delay circuit 8 controlled by the control unit 5, wherein the burst generator 6 generates a voltage signal.

The burst shown as a double pulse is supplied via the resistor R to the measuring electrode 3 and thus also to the medium 1, wherein the high-frequency alternating current is supplied via the environment of the container 2 and either galvanically or in the mentioned measuring frequencies in any case capacitively to the device ground 4 and thus also to the burst generator 6. The inductance L at the measuring electrode 3 shows that it is a resonant system which even in the empty state without medium 1 has a resonance frequency.

When the medium 1 contacts the measuring electrode 3, the resonance frequency changes depending on the relative permittivity (dielectric constant) of the medium 1. The resonant amplitude, on the other hand, changes depending on the conductivity of the medium 1 and its dielectric losses.

The amplitude response at the measuring electrode 3 is first detected as a voltage value behind the low-pass filter 9 serving as a harmonic filter, and then the impedance or the capacitance is calculated based on the measured voltage.

The voltage measurement is carried out by means of a diode bridge 7 which consists of four fast switching diodes and is driven with complementary (sampling) signals.

The signal produced at the output of the diode bridge 7 denoted by X is supplied to an analog-to-digital converter, which is not necessarily arranged in the control unit 5 and whose terminal is denoted here by Y.

This can be done either directly via the terminals designated by X and Y, or via an interconnected conditioner serving for level adjustment and filtering. Subsequently, the signal can be processed purely digitally.

Finally, the control unit 5 has a binary switching output S and an LED for indicating the switching state. The other assemblies of a limit level switch, such as a power supply, operating elements or a bus terminal known to those skilled are omitted because of a better overview.

The spectral analysis of the amplitude response at the measuring electrode 3 is carried out by determining the frequency spectrum of the burst response measured there by means of a Discrete Fourier Transform (DFT) and comparing it pointwise with a frequency spectrum of the burst signal which is measured at the same position in the empty state and is stored in the control unit 5 or in the periphery of a microcontroller. By means of this comparison then the impedance at the measuring electrode is determined.

In an advantageous embodiment the determined frequency spectrum is not compared with the spectrum of the empty case but compared with the case entirely without the measuring electrode 3. The measurement required therefore can be done either before mounting the measuring electrode 3 or with a detached measuring electrode 3. It is also conceivable to define this spectrum for the relevant device type and store it in the device without new measurement.

Without the measuring electrode 3, the resonance is far above the considered frequency range, because it is formed only by the inductance L and the self-capacitance of the printed circuit board. Thus, an undisturbed spectrum in the frequency range of interest is obtained, with which now both the empty state and the different filling states can be compared.

The resonance frequencies of the measuring system can well be in the frequency range of up to 100-200 MHz. According to the Nyquist theorem, sampling intervals of less than half the period length of the highest sampled frequency are required.

Thus, for example, in order to detect a frequency range up to 200 MHz with a frequency resolution of 125 kHz a detected time range of 8 µs is required, which must be sampled at an interval of less than 2.5 ns, which is a considerable challenge to the signal conditioning and the analog-to-digital converter. Computationally more than 400 MSPS (million samples per second) would have to be processed, which is not acceptable for an inexpensive limit level switch not least because of the power requirements of such an arrangement.

The measurement can be terminated when the burst response has fallen so much that no longer significant signal components are included. This means that when the measuring time is extended almost no more change in the amplitude response in the frequency range of interest is evident.

Through measurements it has been found that this is the case after about 10-20 periods of the resonance frequency of the measuring system. The exact value depends on the losses in the resonant system.

The resonant measuring system is attenuated on the one hand by the losses of the medium and on the other hand by losses of the connected electronic circuit in the sensor and the loss resistance of the measuring coil directly in the resonant circuit. Low losses lead to a longer necessary detection time compared to a case with large losses.

Based on this knowledge, the measurement can be completed after only 100-200 nanoseconds without loss of accuracy.

However, undersampling requires multiple repetitions of the burst excitation. Due to the pulse-like nature of the measuring signal, the emission of electromagnetic radiation can be reduced compared to a purely sinusoidal excitation.

The capacitance and the dielectric losses at the measuring electrode can be determined in a way known to those skilled in the art from the Thomson oscillation equation, the oscillation amplitude and the bandwidth and thus from the amplitude response.

It should be noted that the assemblies surrounded by dashed lines in the figure, in particular the burst generator 6 and the delay circuit 7, need not be separately present as such, but their function can be implemented as a program by a microcontroller or as hardware or software with any suitable integrated circuit 10.

For the microcontroller, the STM32F334 family of ST-Microelectronics comes into question, which can also fulfill the function of a computing unit for evaluating the amplitude response of the measuring signal at the measuring electrode 3, where the spectra of the burst signal which is influenced by the medium 1 to be determined by Fourier transform are to be compared with the spectrum of a known burst signal which is not influenced by the medium 1.

Figure 2:
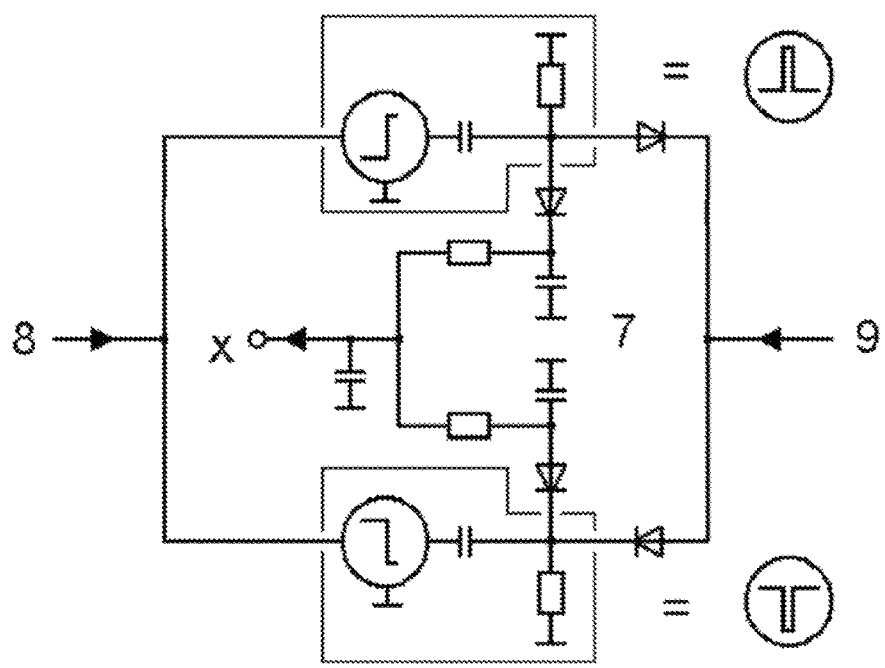
FIG. 2 shows a complementarily driven diode bridge serving as a sampling means in detail.

FIG. 2 shows an exemplary embodiment of the diode bridge 7 shown in FIG. 1 in detail. From a sampling signal generated by the variable delay circuit 8 two complementary edges are generated, which are each converted by a differentiator in two pulses which naturally follow an e-function, but are to be considered as approximately rectangular, wherein the two outlined areas are to symbolize the two square wave generators shown in FIG. 1.

The complementary sampling signals are supplied to the control terminals of the diode bridge 7, causing it to be short-term conductive for the signal coming from the low-pass 9. Undersampling, which is also referred to as time expansion, is implemented in a known manner by means of a small phase shift (beat) between the clock signal and the sampling signal which is determined by the control unit 5 and typically amounts to 3 to 4 orders of magnitude.

Figure 3:
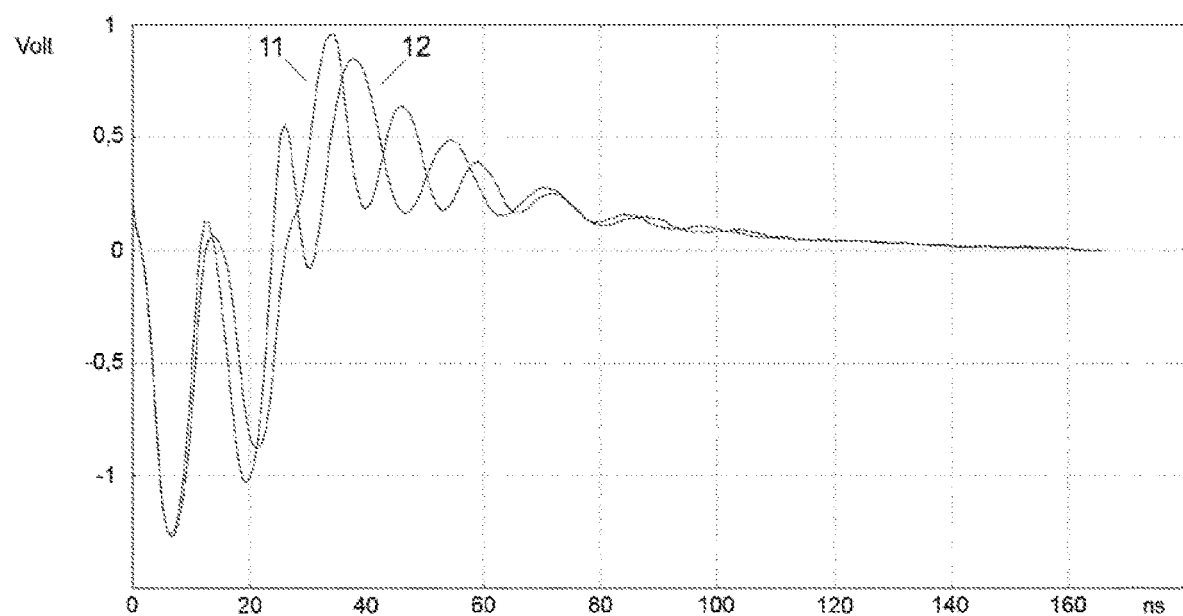
FIG. 3 shows the time signals measured at the measuring electrode 3 with and without medium.

FIG. 3 shows burst signals measured at the measuring electrode 3. Here, the time curve of the burst signals at the measuring electrode 3 obtained by undersampling is shown. The voltage is specified in volts and the time in nanoseconds (ns). The curve denoted by 11 shows the amplitude response without a medium 1, and the curve denoted by 12 shows an amplitude response with a medium 1.

Figure 4:
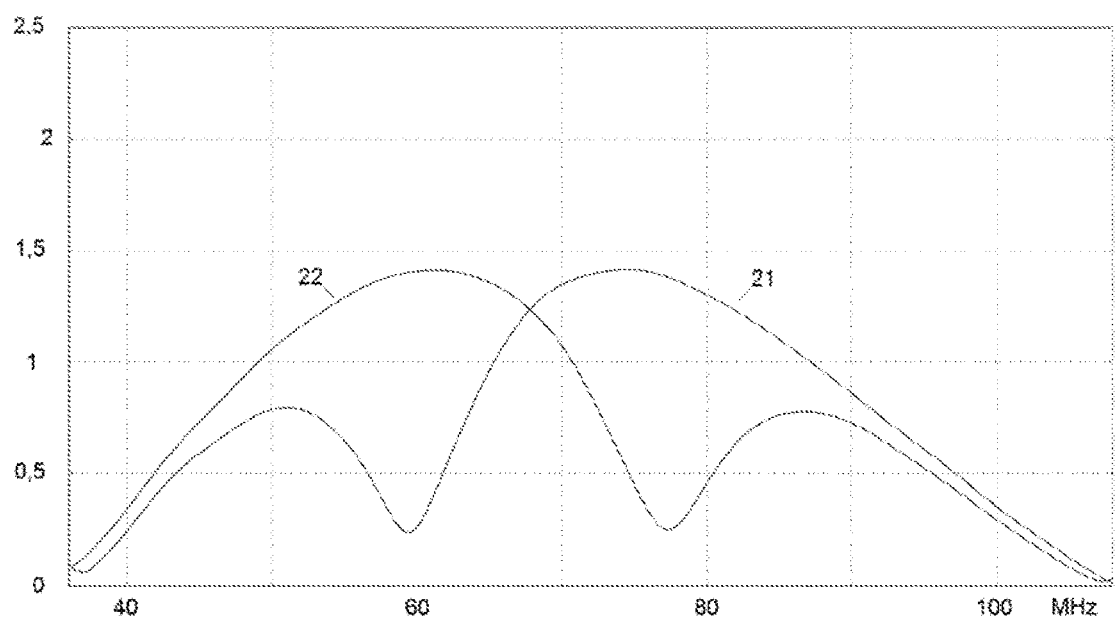
FIG. 4 shows the associated frequency spectra with and without medium.

Due to the additional capacity of the medium 1, the burst signal runs slightly apart in time, which corresponds to the shift in the resonance frequency of the measuring electrode system shown in FIG. 4 towards lower frequencies.

FIG. 4 shows frequency spectra associated with the measuring signals and produced by a Discrete Fourier Transform (DFT) with and without the medium 1. The minimum of the spectrum denoted with 22 without medium 1 is approximately at 75 MHz, whereas the spectrum denoted with 21 with a medium 1 is shifted to below 60 MHz because of the above-mentioned effects.

By specifying the parameters for the burst, its spectrum can be influenced so that the essential components of the signal energy comprise the resonance frequencies of the measurement system in the empty state and in the full state, with the essential part of the signal energy of the spectrum of the burst signal being concentrated around the region of the resonances of the empty state and the full state.

A burst of two periods of one oscillation, whose frequency is near the center of the resonance frequencies of the measuring system in the empty state and in the full state appears to be particularly advantageous, wherein it may also be a square wave signal with said frequency as fundamental frequency.

As a result, the maximum of the spectrum and thus also of the signal energy of the burst is positioned optimally in the measuring range. If the number of oscillations in the burst is increased, the usable bandwidth becomes smaller and smaller. If the signal energy at the resonance frequency in the empty state or in the full state becomes very small, the detection of interference-prone and noise effects becomes increasingly troublesome.

However, if a system is provided where the resonance frequencies of the measuring system in the empty state and in the full state are closer to each other, a burst with, for example, three oscillations could be more advantageous.

Moreover, the oscillation form does not necessarily have to be rectangular. A sinusoidal shape also offers advantages, but rectangular oscillations can be generated considerably simpler by means of the digital technology (microcontroller).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A capacitive limit level switch for liquid or pourable media comprising a measuring electrode which protrudes into a container and forms an electric circuit with the container and a device ground, wherein an impedance at the measuring electrode depends on a presence of the medium, and a control unit including a signal generator and a complementarily controlled diode bridge comprising four switching diodes, wherein a measuring signal is detected in a time domain, and wherein a switching point is determined by a spectral analysis of an amplitude response at the measuring electrode, wherein the measuring electrode is part of a resonant system, the signal generator is a burst generator, the diode bridge serves as a sample-and-hold switch connected to a controllable delay circuit, and a computing unit for evaluating the amplitude response of the measuring signal at the measuring electrode is present, which compares a spectrum of a burst signal which is influenced by the medium with a spectrum of a known burst signal which is not influenced by the medium;

wherein an essential part of signal energy of the spectrum of the burst signal is concentrated around a region of the resonances of an empty state and a full state and a detection time for a burst response is 10 to 20 period lengths of a resonance frequency of a measuring system.

2. The capacitive limit level switch according to claim 1, wherein the burst signal consists of two periods of one oscillation whose frequency is close to the center of the resonance frequencies of the measuring system in the empty state and in the full state.

3. The capacitive limit level switch according to claim 1, wherein the burst signal consists of three periods of one oscillation whose frequency is close to the center of the resonance frequencies of the measuring system in the empty state and in the full state.

4. The capacitive limit level switch according to claim 2, wherein the burst signal is a square wave signal with said frequency as the fundamental frequency.

5. The capacitive limit level switch according claim 1, wherein spectra of measured amplitude responses are compared with a spectrum without measuring electrode stored in the limit level switch.

* * * * *